Patented May 10, 1949

2,469,420

UNITED STATES PATENT OFFICE 2,469,420

DEHYDROGENATION OF HYDROCARBONS

Carlisle M. Thacker, Highland Park, Ill., assignor to The Pure Oil Company, Chicago, Ill., a corporation of Ohio No Drawing. Application December 26, 1942, Serial No. 470,302

3 Claims. (Cl. 260—683.3)

This invention relates to the catalytic dehydrogenation of hydrocarbons and more particularly to dehydrogenation of hydrocarbons boiling within or below the gasoline boiling range.

This invention is a continuation in part of my application Serial No. 180,531, entitled "Dehydrogenation of hydrocarbons," filed December 18, 1937, now Patent 2,354,892. In accordance with my invention hydrocarbons having two or more carbon atoms in the molecule such as ethane, propane, butane or corresponding olefins, such as butylene, as well as higher boiling hydrocarbons such as hexane, heptane and octane may be dehydrogenated by contacting the same at temperatures within the range of 350 to 750° C. with "activated alumina" of commerce impregnated with an oxide of a metal of the second group of the periodic table selected from the group consisting of beryllium, magnesium and zinc. The activated alumina contemplated in my invention may be prepared by precipitating tri-hydrate from an aluminate solution and calcining the precipitate at temperatures of 300° to 800° C., all in accordance with the method set forth in the patents to Barnitt 1,868,869 and Derr 2,015,593. Although I have specified "activated alumina" of commerce, any activated alumina which has substantially the same physical and chemical characteristics or catalytic activity as "activated alumina" of commerce may be used. "Activated alumina" of commerce has approximately the following chemical constitution:

| | Per cent by weight |
|---|---|
| Silica | 0.07 |
| Ferric oxide | 0.05 |
| Sodium oxide | 0.46 |
| Aluminum oxide | 89.02 |

Water, balance.

Upon spectroscopic analysis activated alumina will show the following lines with the comparative intensities indicated:

| | |
|---|---|
| Sodium | 0.6+ |
| Titanium | 3 |
| Gallium | 1 |
| Silicon | 4 |
| Iron | 5 |

The intensities of the lines may vary somewhat as between various samples.

At 10 magnifications activated alumina shows a laminated structure with visible pores.

The catalyst in accordance with my invention is preferably prepared by mixing a salt solution of the desired metal with activated alumina and heating the mixture with frequent stirring until almost dry and then completing the drying slightly above the boiling point of the water. The dry catalyst is then decomposed by contacting it with air at a higher temperature, not above 800° C., in order to convert the metal compound to oxide. Just prior to use, the catalyst is heated with hydrogen or inert gas at elevated temperature for a prolonged period of time and is then ready for use.

The following examples represent methods of preparing catalysts in accordance with my invention.

*Example 1.*—36.7 grams of beryllium nitrate $(Be(NO_3)_2 \cdot 3H_2O)$ were dissolved in 225 cc. of water and 125 cc. of concentrated nitric acid. This solution was added to 8–14 mesh "activated alumina" of commerce which had previously been heated for 2½ hours to 200° F. The mixture was then heated on a water bath with frequent stirring until almost dry and then decomposed in a current of air in which the catalyst was gradually heated over a period of 4½ hours from 20 to 186° C., 13 hours from 186 to 276° C., 3 hours from 210 to 400° C., and then for 5 hours at a temperature slightly above 400° C.

*Example 2.*—58.3 grams of zinc nitrate $Zn(NO_3)_2 \cdot 6H_2O$ were dissolved in 250 cc. of water. This solution was added to 400 grams of 8–14 mesh "activated alumina" of commerce which had been heated in an electric oven for 2 hours at 130° C. The mixture was thoroughly stirred and evaporated to a small volume over a small Bunsen flame and finally dried in an electric oven at 130° C. The dried catalyst was treated with a solution consisting of 300 cc. of water and 30 cc. of concentrated ammonium hydroxide. After standing for 40 hours the solution was filtered and the catalyst washed 5 times with 300 cc. per wash of distilled water, and then dried at 120° C.

*Example 3.*—40.3 grams of magnesium nitrate $Mg(NO_3)_2 \cdot 6H_2O$ were dissolved in 250 cc. of water. This solution was added to 8–14 mesh "activated alumina" of commerce which had been dried for 30 minutes in an electric oven at 130° C. The mixture was frequently stirred while being evaporated almost to dryness in the water bath and the drying was completed in the electric oven at 130° C. The catalyst was then covered with 6 normal ammonium hydroxide and allowed to stand one week. The mixture was filtered and washed 6 times with 300 cc. of boiling water per wash after which it was dried in an electric oven at 105° C.

*Example 4.*—16.5 grams of magnesium carbonate were dissolved in an excess of acetic acid making 196 cc. of solution and this solution was used to impregnate 400 grams of 8-14 mesh "activated alumina" of commerce in the same manner as used in the preparation set forth in Example 3 with the exception that the ammonium hydroxide treatment was omitted.

In dehydrogenating lower boiling hydrocarbons higher temperatures are generally required than are necessary with the higher boiling hydrocarbons. For example in the dehydrogenation of ethane temperatures above 600° C. are necessary to obtain substantial yields, whereas in the case of butane temperatures of the order of 550° C. will give satisfactory yields of unsaturated $C_4$ hydrocarbons. If it is desired to dehydrogenate a mixture of hydrocarbons the optimum temperature will depend upon the relative proportions of the several constituents in the mixture, but in any case will lie somewhere between the optimum temperatures for the individual constituents. The dehydrogenation may be carried out in conventional apparatus at atmospheric, sub-atmospheric or super-atmospheric pressures. However, where it is desired to dehydrogenate paraffins or olefins to diolefins, sub-atmospheric pressures should be used and/or steam or other inert gas or vapor should be mixed with the charging stock in order to lower the partial pressure of the hydrocarbons to be dehydrogenated. It is preferable to heat the charging stock to conversion temperature prior to charging it to the reactor containing the catalyst. The reactor is preferably heated to maintain it at all times at conversion temperature. When dehydrogenating paraffins to olefins the presence of large quantities of water vapor should be avoided since water vapor when present in excessive amounts lowers the activity of the catalyst although small amounts are not harmful. I have found that gas saturated with water vapor at 0° C. is not harmful whereas the same gas saturated with water vapor at room temperature is decidedly deleterious.

In order to demonstrate the efficacy of catalysts in accordance with my invention a series of runs were made using ethane containing a small amount of impurities as the charging gas. The results on these runs are tabulated in the table. No analysis of the gases from run #1 was made. The volume of increase of 3% shows that the ethylene yield could not have been more than 3% even assuming 100% efficiency.

In run #2 the catalyst used was prepared in accordance with Example 1. The ratio of 20 to 1 indicated for the catalyst is the molal ratio between the weight of activated alumina and beryllium in the salt used in preparing the catalyst. The catalyst used in run #3 was prepared in accordance with Example 2 and the catalyst used in runs 4 and 5 was prepared in accordance with Example 3. In each case the ratio indicated is the molal ratio of activated alumina to the metal content of the salt used in preparing the catalyst.

In each of the runs the charging gas was preheated in a heating coil to approximately the desired reaction temperature before passing the gas through a bed of catalyst contained in a reaction chamber, the temperature of which was maintained at the desired reaction level by an electric heating element. The runs were all conducted at substantially atmospheric pressure. The catalyst used in runs #4 and #5 was purged with nitrogen while the catalyst was being heated to reaction temperature. Fresh catalyst was used in each run.

Table

| Run No. | Sample | Catalyst | Temp., °C. | Space Velocity | Length of Run | Time After Start Sample Taken | Percent By Vol. $C_2H_6$ Reacting | Percent By Volume Yield of $C_2H_4$ | Efficiency [3] |
|---|---|---|---|---|---|---|---|---|---|
| 1 | | None | 650 | 169 | 1 Hr., 30 Min. | 1 Hr. | [2] 3 | | |
| 2 | a | Act. $Al_2O_3$: Be 20:1. | 642–647 | 586 | 7 Hrs., 14 Min. | 2 Hrs., 23 Min. | 14.8 | 0.119 | 85 |
|   | b |   | 649–654 | 582 |   | 7 Hrs., 1 Min. | 14.8 | 0.106 | 75 |
| 3 | a | Act. $Al_2O_3$: Zn 20:1. | 685 | 348 | 28 Hrs., 39 Min. | 20 Hrs., 35 Min. | 13.5 | 0.098 | 77 |
|   | b |   | 700 | 360 |   | 22 Hrs., 37 Min. | 15.9 | 0.111 | 75 |
| 4 [1] | | Act. $Al_2O_3$: Mg 20:1. | 649 | 347 | 5 Hrs., 58 Min. | 4 Hrs., 12 Min. | 14.8 | 0.106 | 74 |
| 5 [1] | a | Act. $Al_2O_3$: Mg 20:1. | 687 | 913 | 8 Hrs., 39 Min. | 3 Hrs., 57 Min. | 8.6 | 0.066 | 80 |
|   | b |   | 687 | 792 | 8 Hrs., 39 Min. | 6 Hrs., 20 Min. | 12.7 | 0.074 | 60 |

[1] Gas saturated with water at 0° C.
[2] Represents increase in volume of reaction gas over charging gas.
[3] % of ethane reacting which forms ethylene.

The catalysts in accordance with my invention maintain their activity for comparatively long periods of time, ranging from approximately 5 hours or less where temperatures in the neighborhood of 700° C. are used to more than 24 hours where temperatures of about 525 to 550° C. are used. The efficiency of the fresh catalysts is approximately 75% or better. The catalysts are readily reactivated by burning off with air or oxygen and purging in a hydrogen or inert gas atmosphere. In reactivating the catalyst, it is important that the temperature of reactivation be kept below 800° C., since temperatures above 800° C. permanently injure the catalyst and lower the activity thereof.

The space velocity, which is defined as the ratio of the volume of charging gas or vapor per hour to the volume of the space occupied by the catalyst, may vary over wide limits. I have found space velocity of from 150 to 10,000 to be satisfactory. Generally speaking, lower space velocities give higher rates of conversion, and high space velocities give lower rates of conversion. The optimum space velocity to be used will be dependent upon the particular temperature at which the dehydrogenation is conducted, since low space velocities with higher temperatures have a tendency to cause decomposition and carbon formation to occur. The optimum space velocity and temperature for obtaining the highest efficiency and highest yield of the desired unsaturated hydrocarbon can be determined empirically for each charging stock and catalyst.

Although in the specific examples previously given the catalysts were prepared by using a molal ratio of activated alumina to metal of 20 to 1, this ratio may vary over wide limits. The content of metal, deposited as metal oxide on the activated alumina, may vary from .5% to 30% by weight of the activated alumina. Amounts of oxide ranging from 1 to 10% calculated as metal are preferred.

Catalysts herein described, particularly magnesium oxide on activated alumina are especially useful in the dehydrogenation of butane or butene or mixtures thereof to butadiene under conditions of sub-atmospheric pressure or at a low butane and/or butene partial pressure.

I claim:

1. The method of dehydrogenating dehydrogenatable hydrocarbons which comprises, contacting said hydrocarbons at an elevated temperature suitable for dehydrogenation with a catalyst composed of activated alumina impregnated with beryllium oxide.

2. The method of dehydrogenating gas selected from the group consisting of ethane, propane and butane, which comprises, contacting the gas at a dehydrogenating temperature between 350° and 750° C. with a catalyst consisting of activated alumina impregnated with beryllium oxide.

3. The method of dehydrogenating dehydrogenatable hydrocarbons comprising, contacting said hydrocarbons at temperatures of approximately 350° to 750° C., with a catalyst prepared by impregnating activated alumina with a solution of beryllium nitrate, drying the resulting mixture and heating in contact with air to an elevated temperature not in excess of 800° C., sufficient to form beryllium oxide.

CARLISLE M. THACKER.

REFERENCES CITED

The following references are of record in the file of this patent:

UNITED STATES PATENTS

| Number | Name | Date |
|---|---|---|
| 1,732,381 | Schmidt et al. | Oct. 22, 1929 |
| 1,943,246 | Towne | Jan. 9, 1934 |
| 2,131,089 | Beeck et al. | Sept. 27, 1938 |
| 2,148,140 | Tropsch | Feb. 21, 1939 |
| 2,168,840 | Groll | Aug. 8, 1939 |
| 2,184,235 | Groll et al. | Dec. 19, 1939 |
| 2,227,639 | Frey et al. | Jan. 7, 1941 |
| 2,231,231 | Subkow | Feb. 11, 1941 |
| 2,279,199 | Huppke | Apr. 7, 1942 |

FOREIGN PATENTS

| Number | Country | Date |
|---|---|---|
| 264,827 | Great Britain | Mar. 1 1928 |
| 596,094 | Germany | May 2, 1934 |